United States Patent [19]

Fleischer et al.

[11] Patent Number: 4,819,554
[45] Date of Patent: Apr. 11, 1989

[54] TRANSFER AND QUICK CHANGE SYSTEM

[75] Inventors: Dennis G. Fleischer, Horicon; Robert J. Smola, Watertown; James H. Draeger, Beaver Dam, all of Wis.

[73] Assignee: Deere & Company, Moline, Ill.

[21] Appl. No.: 90,649

[22] Filed: Aug. 28, 1987

[51] Int. Cl.$^4$ ............................................. B30B 15/02
[52] U.S. Cl. ...................... 100/224; 72/448; 414/535; 193/35 SS; 193/35 MD
[58] Field of Search ...................... 100/224, 918, 221; 72/448; 297/460; 414/532, 535, 531; 193/35 SS, 35 MD

[56] References Cited

U.S. PATENT DOCUMENTS

| | | | |
|---|---|---|---|
| 3,011,665 | 12/1961 | Wise | 414/535 |
| 3,447,665 | 6/1969 | Egeland et al. | 193/35 MD |
| 3,710,917 | 6/1973 | Black et al. | 193/35 MD X |
| 3,804,230 | 4/1974 | Krivec | 193/35 MD X |
| 3,831,427 | 8/1974 | Lee | 100/224 |
| 3,878,773 | 4/1975 | Smit | 100/53 |
| 4,456,116 | 6/1984 | Jarman | 193/35 MD X |
| 4,498,384 | 2/1985 | Murphy | 100/918 X |
| 4,592,588 | 6/1986 | Isono et al. | 297/460 X |
| 4,691,554 | 9/1987 | Murphy | 100/224 X |

Primary Examiner—Andrew M. Falik

[57] ABSTRACT

An die transfer and quick change system comprising at least four T-lift units installed in T-slots formed in the surface of the machine bolster. The T-lift units are installed in the bolsters so that there are at least two systems for positioning the die parallel to the machine or press and at least two systems for positioning the die perpendicular to the machine or press. A control mechanism is provided for selectively inflating and deflating the air bag in each of the T-lift units. The control mechanism provides for two separate T-lift systems which are inflated or deflated independently of each other. A pre-staging table is provided adjacent the machine or press bolster for pre-staging a plurality of dies thereon and for transporting selected dies to and from the machine. Utilizing the system of the present invention, an operator can move a die from the pre-staging table onto the machine or press bolster and thereafter accurately and properly position the die on the machine or press while minimizing the effort required and maximizing the speed and accuracy of the positioning. Then, upon completion of a production run, with the particular die installed in the machine or press, an operator can disengage the die from the machine or press, return the die to the pre-staging tble, move a second die from the pre-staging table onto the press for precisely positioning the new die on the bolster with a minimum of time and effort and without outside assistance.

19 Claims, 3 Drawing Sheets

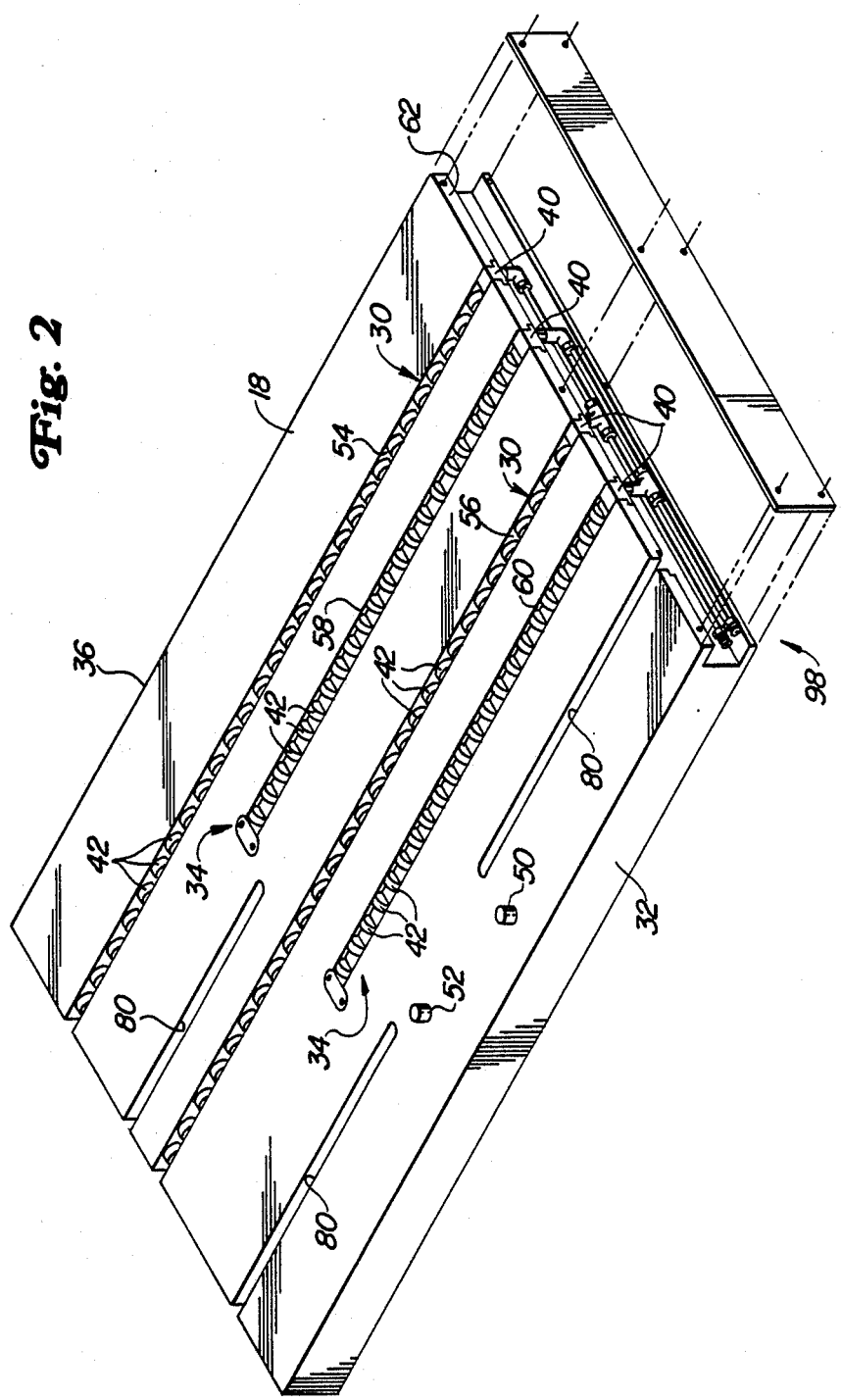

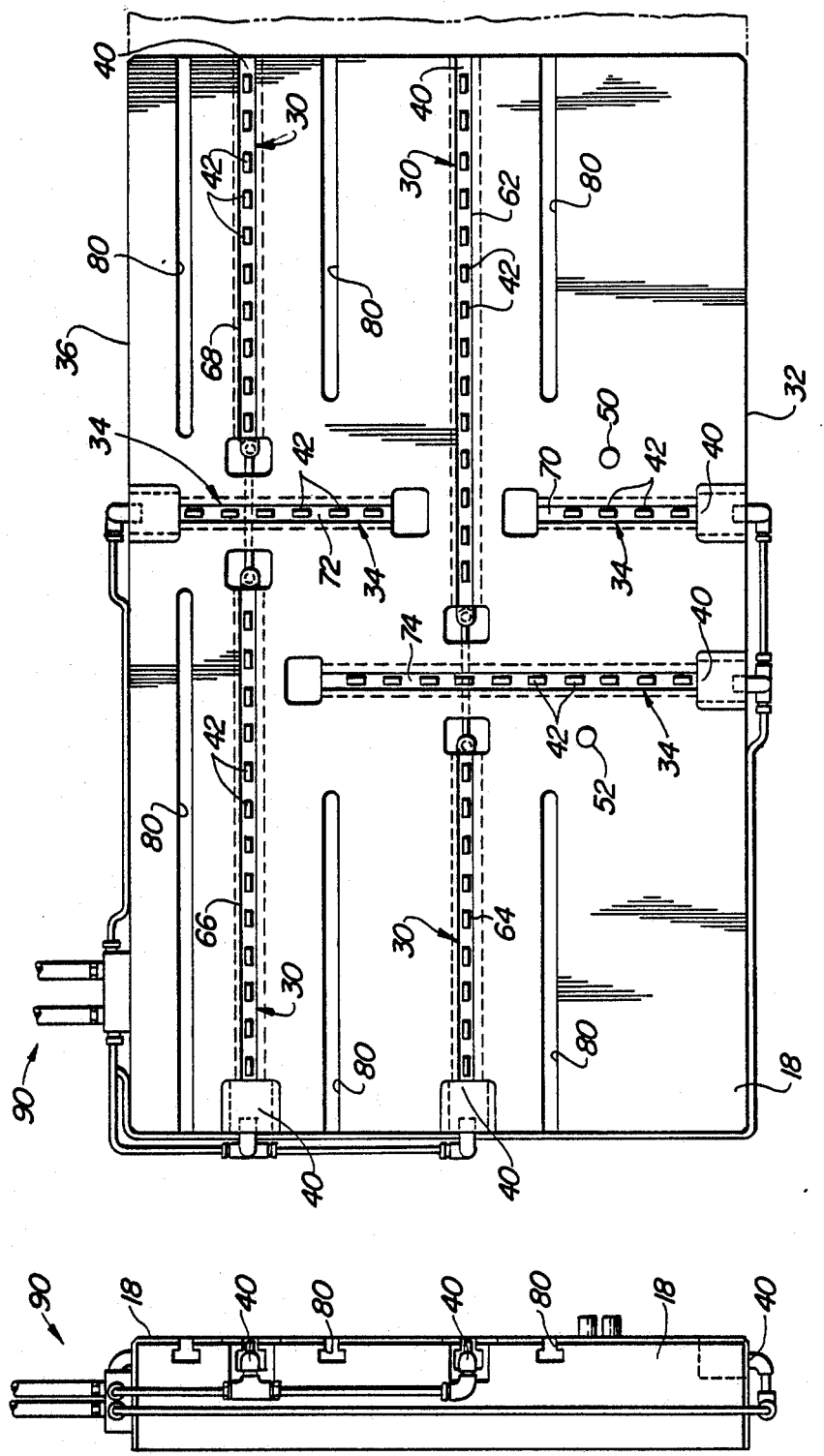

TRANSFER AND QUICK CHANGE SYSTEM

BACKGROUND OF THE INVENTION

The present invention relates generally to a system for positioning dies in a machine or press, and more specifically, to a system for transferring dies from a pre-staging table to a machine or press thereby allowing a die to be easily and accurately adjusted in at least two directions so that an operator can quickly and precisely locate the die in the machine or press without external assistance.

Machines, especially presses, typically utilize a plurality of different dies to produce a plurality of different parts. If production schedules require that a single machine or press produce more than one part number, then the dies must be changed each time the schedule calls for the production of another part number. In the past, it was conventional for a fork lift operator to deliver the new die from a remote storage location for each job change and then to assist the machine operator with the positioning of the die in the machine. It is obvious that die changes completed in this manner are wasteful and uneconomical in that they interrupt machine operation and are time consuming by requiring exact positioning of the die in the machine and thus, reduce machine utilization.

In the past, machine utilization was maximized by scheduling lengthy part runs which kept the number of die changes to a minimum. However, this system resulted in inflexible production schedules and could not be readily changed without adversely affecting machine utilization and the dependent assembly operations.

If an assembly operation utilizing the just-in-time concept was supplied by a machine or press, an increased number of die changes was required in order to meet the production schedules and thus, would most likely unacceptably reduce machine utilization.

Previous attempts to minimize die changeover time include the use of tables located adjacent the machine to support a die prior to being positioned in the machine. One example of such a die staging table is disclosed in U.S. patent application Ser. No. 914,692, the disclosure of which is hereby incorporated by reference, filed 2 Oct. 1986, which is commonly owned by the assignee of the present invention. This die staging table includes a top surface consisting of ball transfers on uniform centers. The ball transfers are attached to form steel strips which in turn are attached to a welded steel framework. A plurality of dies can be pre-positioned on the die table both before and after utilization in the machine or press.

While the die staging table mentioned above reduced a certain amount of die changeover time, by allowing the die to be positioned adjacent the press and to be rolled up to the machine bolster by the operator without help, dies weighing in excess of 1500 pounds still required that the machine operator receive some sort of assistance when positioning the die in the machine or press.

Die transfer systems are presently available for properly positioning a die on a bolster in the press. An example of such a die transfer system is disclosed in U.S. Pat. No. 4,498,384 issued 12 Feb. 1985, the disclosure of which is hereby incorporated by reference. This transfer system includes a pair of elongated, parallel upwardly opening cavities having horizontally extending vertical moveable rails therein. A plurality of rollers are supported by each rail so as to be moveable vertically therewith. An air bag extends longitudinally of each of said cavities under the rails and is engageable with the bottom thereof. Air bag inflation effectuates elevation of the rails and rollers into engagement with the bottom of a die and thereby elevates the die relative to the press bolster.

While this particular system greatly reduced the amount of effort required to transfer the die into the bolster, this particular system was effective to make the transfer in only one direction.

Multi-directional systems are also currently available, examples include hydraulic die lifters and spring loaded die lifters available from Raster Machinery Inc. These systems have precision ball bearings which allow for a full 360° movement of the die on the bolster.

While these spring loaded and hydraulic die lifters allowed for precise location of the die within the press, the complex hydraulic systems associated with these hydraulic die lifters caused significant maintenance problems and were not always available to assist the operator in positioning the die on the bolster and dirt in roller housing added to effort in positioning. The spring loaded lifters were not retractable and were not of sufficient strength to lift heavy dies for proper positioning. Additionally, the springs fatigued and needed to be replaced regularly.

Thus, there is a need for a die handling and location system which provides for at least two directional positioning of the die on the machine bolster; which allows an operator to accurately and rapidly position a die in excess of 1500 lbs. on the press without outside assistance; which provides maximum machine utilization; which provides high reliability and which provides for low maintenance cost.

SUMMARY OF THE INVENTION

The present invention is an improved die transfer and quick change system consisting of at least four T-lift units, commercially available from Wardcraft Die Products Division of McLaughlin, Ward & Company of Jackson, Michigan, installed in T-slots formed in the surface of the machine bolster. The T-lifts are installed in the bolster so that there are at least two systems for positioning the die parallel to the machine or press and at least two systems for positioning the die perpendicular to the machine or press. The specific arrangement of the T-lifts to accomplish both functions is an important feature of the present invention.

A control mechanism is provided for selectively inflating and deflating the air bag in each of the T-lift systems. The control mechanism provides for the two separate T-lift systems to be inflated independently of each other.

Another important feature of the present invention is the ability of an operator to move a die from a pre-staging table onto a machine or press bolster and thereafter accurately and properly position the die within the machine or press while minimizing the effort required and maximizing the speed and accuracy of the positioning; then, upon completion of a production run with that particular die, disengage the die from the machine or press, return the die to the die pre-staging table, move a second die from the pre-staging table onto the press and precisely position the new die on the bolster in the machine or press with a minimum of time and effort and without outside assistance.

Thus, the primary object of this invention, therefore, is to provide an improved system for changing dies in a machine or press; to provide for exact location of the die on the machine or press; to provide for at least two directional movement of the die on the bolster; to allow an operator to frequently change dies with a minimum of effort and assistance and to maximize machine utilization time in order to meet flexible production schedules in conjunction with just-in-time assembly operations.

BRIEF DESCRIPTION OF THE DRAWINGS

FIG. 2 is a perspective view of the preferred embodiment of the die transfer and quick change system of the present invention installed in a bolster of the machine of FIG. 1;

FIG. 3 is a top view of an alternate embodiment of the die transfer and quick change system of the present invention installed in the machine of FIG. 1;

FIG. 4 is a side view of the die transfer and quick change system of FIG. 2.

DESCRIPTION OF A PREFERRED EMBODIMENT

Figure 1:
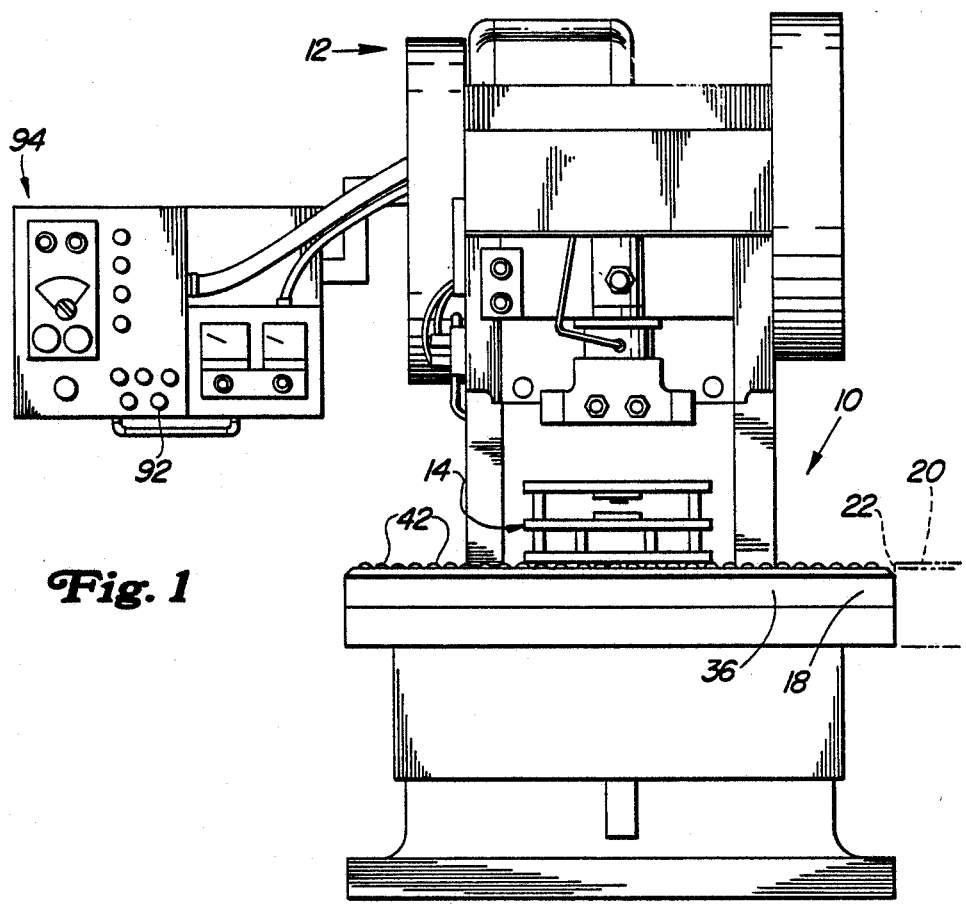
FIG. 1 is a front view of a machine having the die transfer and quick change system of the present invention incorporated therein.

As shown in FIG. 1, a die transfer and quick change system, 10, in accordance with the present invention, is incorporated for use with a stamping press 12. The die transfer and quick change system 10 of the present invention is utilized to facilitate the movement of a die 14 onto the press bolster 18 and to precisely position the die 14 on the press bolster 18 so that a minimum amount of press time is required for the operator to change the dies in the press. It should be pointed out that with the system of the present invention, the operator can accomplish the die change without external assistance.

As best shown in FIGS. 1-3, the die transfer and quick change system 10 of the present invention comprises a die change staging table 20 positioned contiguous with the bolster 18. The details of the die staging table are disclosed in U.S. patent application Ser. No. 914,692, identified hereinabove. The die staging table 20 can be utilized to stage a plurality of dies 14 for installation in the machine or press 12 in any sequence as may be necessary according to a predetermined production schedule. The die staging table 20 incorporates means for easily moving the dies 14 from place to place on the table 20 and particularly to the edge 22 of the table which is contiguous with the bolster 18.

Figure 5:
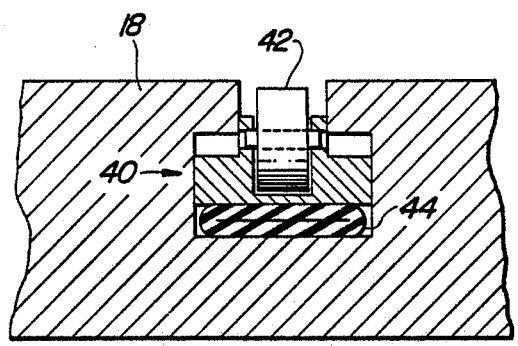
FIG. 5 is a partial side view of the air bag roller system utilized with the die transfer and quick change system of the present invention.

As best shown in FIGS. 2-4, the bolster 18 includes means 30, 34, respectively, for precisely positioning a die both parallel to the length 32 of the bolster and perpendicular to the length 32 of the bolster. As illustrated, this ability to precisely position the die on the bolster 18 includes the parallel positioning means 30 and the perpendicular positioning means 34 which each comprise at least two die transfer systems 40 having a plurality of rollers 42 operatively positioned thereon mounted beneath the surface of the bolster 18 and which are selectively elevated into engagement with the bottom of a die 14 positioned thereon by an air bag unit 44 (FIG. 5). The preferred transfer system is disclosed in the aforementioned U.S. Pat. No. 4,498,384 and is commercially available from the Wardcraft Die Products Division of McLaughlin, Ward & Company of Jackson, Mich.

Also incorporated into the bolster are a pair of location pins 50, 52 which are designed to align with a pair of V-notches (not shown) formed in adapters attached to the bottom of each die 14 to precisely locate the die on the machine or press 12 at all times.

As shown in FIGS. 2-4, a typical die bolster incorporating the system of the present invention comprises at least four die transfer systems or air bag units 40 operatively positioned in the bolster parallel to the longer side 32 of the bolster 18. These parallel sets of air bag units 40 are arranged such that they are nearer to the operator's side 36 of the bolster 18 than to the locating pins 50, 52 or the side 32.

In the preferred embodiment shown in FIG. 2, four air bag units 40 are arranged parallel to each other and parallel to the length of the bolster 18. Two units 54, 56 are relatively longer than the other two units 58, 60. All four units are contiguous with one end 62 of the bolster 18 which is itself contiguous with the die table 20. The rollers 42 of units 54, 56 are arranged to facilitate movement of the die parallel to the two units 54, 56. The rollers 42 of the units 58, 60 are arranged to facilitate movement of the die perpendicular to the two units 58, 60.

In the alternative embodiment illustrated in FIGS. 3 and 4, four units 62, 64, 66, 68 are arranged to facilitate movement of a die parallel to themselves with units 62, 68 being arranged adjacent and parallel to themselves and units 64, 66 being arranged adjacent and parallel to themselves.

Three air bag units 70, 72, 74 are arranged in approximately the center of the bolster 18 perpendicular to the four air bag units 62, 64, 65, 68. Air bag unit 74 intersects the first set of parallel air bag units 62, 64 and extends to nearly the second set of air bag unit 66, 68. A second perpendicular air bag unit 72 intersects the second set of parallel air bag units 66, 68 and extends nearly to the first set of parallel air bag units 62, 64. A third perpendicular air bag unit 70 is colinear with the first perpendicular air bag unit 72 but does not intersect the first set of parallel air bag units 62, 64. The locating pins 50, 52 are located between the side 32 of the bolster 18 and the second set of parallel air bag units 62, 64, one locating pin 50 being positioned proximate the third perpendicular air bag unit 70 and the other locating pin 52 being located proximate the first perpendicular air bag unit 74.

To assist in firmly securing the die 14 to the bolster 18, a plurality of grooves 80 are formed in the bolster 18 for receiving clamps (not shown) for securing the die 14 in place on the bolster 18.

Each air bag unit 54, 56, 58, 60, 62, 64, 66, 68, 70, 72, 74 is operatively connected to an air supply system 90. The air supply system includes a selector switch 92 positioned on the press control panel 94. The selector switch 92 has at least three positions for parallel inflate, off, and perpendicular inflate. The air supply system 90 is preferably enclosed within bolster 18 as shown in FIG. 2, but it may be exposed on the exterior of the bolster 18 as shown in FIGS. 3 and 4.

In operation, a plurality of dies 14 (not shown) are prestaged on a staging table 20. An operator selects one of the dies and moves it on the staging table to an area 22 proximate the machine bolster 18. The operator then disconnects the first die which is installed in the press 12 and activates the perpendicular air bag units 58, 60 or 70, 72, 74 having rollers for moving the die 14 away from the location pins 50, 52. The press operator then deflates the air bags 40 in the units 58, 60 or 70, 72, 74 having the perpendicular rollers 42 and inflates the bags 40 on the units 54, 56 or 62, 64, 66, 68 having parallel rollers 42. The operator then moves the die 14 supported by the air bag rollers 42 onto the die staging table 20 and moves a second die (not shown) onto the bolster 18 utilizing the air bag units 54, 56 or 62, 64, 66, 68.

Once the new die is lined up approximately with the locating pins, the air bag units 54, 56 or 62, 64, 66, 68 are deflated and the air bag units 58, 68 or 70, 72, 74 rollers for perpendicular movement are inflated. The operator then precisely positions the die 14 on the machine bolster 18 by moving the die toward the location pins 50, 52 until the V's in the die subplate and the pins line up. At this point, the operator deflates the air bag units 58, 60 or 70, 72, 74 by moving the switch from the inflate to the off position and secures the die 14 into place utilizing clamps (not shown). After securing the new stock, etc., the operator commences operation of the machine or press and completes the scheduled production run for those parts which are made by the die which is installed.

Thus, it can be seen that the die transfer and quick change system 40 and the method of utilizing this system maximize machine utilization while simultaneously reducing the die changeover time, reducing work-in-process inventory and providing for flexible schedules to meet just-in-time assembly operations.

While the methods herein described and the forms of apparatus for carrying these methods into effect constitute preferred embodiments of this invention, it is to be understood that the invention is not limited to these precise methods and forms of apparatus, and that changes may be made in either without departing from the scope of the invention which is defined in the appended claims.

What is claimed is:

1. A system for maximizing machine utilization comprising:
    a machine having a bolster;
    means, operatively connected to said machine, for operating selected dies of a plurality of dies to produce a plurality of parts;
    means, operative connected to said machine for pre-staging at least two of said plurality of dies thereon and for transferring said selected dies from said pre-staging means to said machine;
    first means, operatively connected to said bolster, for adjusting said selected dies parallel to said operating means;
    second means, operative connected to said bolster, for adjusting said selected dies perpendicular to said operating means; and
    means, operatively connecting said first and said second adjusting means, for selectively actuating and deactuating said first and said second adjusting means so that said selected dies are rapidly and accurately positioned on said operating means with a minimum of time and effort, said selectively actuating and deactuating means having at least three positions, when in one position, both of said first and said second adjusting means are deactuated, when in another position, only one of said first and said second adjusting means is deactuated and the other is actuated, when in a position different from the two previous positions, only the one of said first and said second adjusting means which was actuated is deactuated and the one that was deactuated is now actuated.

2. The system of claim 1 wherein said pre-staging means further comprises:
    a horizontally disposed support including transfer means for permitting rapid and easy movement of said dies on said support portion.

3. The system of claim 1 wherein said first adjusting means further comprises:
    a first set of at least four parallel quick die change systems.

4. The system of claim 3 wherein said second adjusting means further comprises:
    a second set of at least three parallel quick die change systems, said second set of said quick die change systems being positioned on said machine perpendicular to said first set of die change systems.

5. The system of claim 4 wherein each of said quick die change systems further comprises:
    fluid container means having a plurality of roller means operatively connected thereto;
    cavity means, operatively positioned in said machine, for receiving said fluid container means; and
    means, operatively connected to said fluid container means, for inflating said fluid container means so that said roller means raise said die above an upper surface of said bolster, said cavity means having means for retaining said fluid container means within said cavity means while allowing said roller means to selectively exit the confines of said cavity means.

6. The system of claim 4 wherein each of said quick die change systems further comprises:
    fluid container means having a plurality of roller means operatively connected thereto;
    cavity means, operatively positioned in said bolster, for receiving said fluid container means; and
    means, operatively connected to said fluid container means, for inflating said fluid container means so that said roller means raise said die above an upper surface of said operating means, said cavity means having means for retaining said fluid container means within said cavity means while allowing said roller means to selectively exit the confines of said cavity.

7. The system of claim 6 wherein said selective actuating means further comprises:
    selection switch means, operatively connected to said inflation means, for selectively inflating each of said fluid container means so that said die is first operatively positioned on said bolster parallel to said operating means and is second operatively positioned on said bolster perpendicular to said operating means.

8. The system of claim 7 wherein said selection switch is operatively connected to a source of pressurized air and to said fluid container means that said fluid container means are selectively inflated and deflated respectively.

9. The system of claim 6 wherein said selective actuating means further comprises:
    selection switch means, operatively connected to said inflating means, for selectively inflating each of said fluid container means so that said die is first operatively positioned on said bolster perpendicular to said operating means and is then operatively positioned on said bolster parallel to said operating means.

10. The system of claim 6 wherein said selective actuating means further comprises:

selection switch means, operatively connected to said inflating means, for selectively inflating said fluid container means such that said selected die is first accurately positioned parallel to said operating means and is then accurately positioned perpendicular to said operating means.

11. The system of claim 1 wherein said bolster further comprises:

a plurality of T-slots formed therein and at least two location pins attached thereto.

12. The system of claim 1 wherein said first adjusting means further comprises:

a first set of at least two parallel quick die change systems.

13. The system of claim 12 wherein said second adjusting means further comprises:

a second set of at least two additional parallel quick die change systems, said first set being parallel to said second set.

14. A system for maximizing machine utilization comprising:

a machine tool including a bolster with an upper surfaces;

means, operatively connected to said machine tool, for operating one of a plurality of dies to produce a plurality of parts;

a horizontally disposed support, operatively connected to said bolster, for pre-staging a plurality of dies thereon and for transferring a selected die from said support to said bolster and from said bolster to said support, said support including transfer means for permitting rapid and easy movement of said dies thereon;

a first set of at least two parallel selectively inflatable and deflatable quick die change systems operatively connected to said bolster for positioning said selected die parallel to said operating means;

a second set of at least two parallel selectively inflatable and deflatable quick die change systems operatively connected to said bolster for positioning said die perpendicular to said operating means; and at least one selection switch, operatively connected to each set of said quick die change systems and to a supply of pressurized fluid, for selectively inflating and deflating said sets of systems so that said selected die is operatively positioned on said bolster said selection switch having at least three positions, when in one position, both said two sets of quick die change systems are deflated, when in another position, only one of said two sets of quick die change systems is inflated and the other system is deflated, when in still another position, only the one of said two sets of said quick die change systems which was inflated is now deflated and the other system which was deflated is now inflated.

15. The system of claim 14 wherein each of said quick die change systems further comprises:

a fluid bag;

a steel lift rail having a plurality of crown rollers operatively positioned on said fluid bag; and valve means for controlling the amount of fluid in said bag such that when said bag is filled with fluid said rollers raise said die above said upper surface of said bolster thereby reducing the amount of effort needed to move said die.

16. A method for maximizing machine operation comprising the steps of:

disconnecting a first die operatively positioned on a machine in an operating position;

actuating a first set of at least two quick die change systems having roller means operatively connected thereto, said system being operatively positioned on said machine;

removing said first die from said operating position in said machine utilizing said first set of said quick die change systems;

deactuating said first set of quick die change systems;

actuating a second set of at least two quick change die systems having roller means operatively connected thereto, for moving said die in a direction perpendicular to the direction of movement provided by said first set of systems, said second set of systems being operatively positioned on said machine;

moving said first die onto a pre-staging table;

moving a second die onto said machine from said pre-staging table by utilizing said actuated second set of quick die change systems;

positioning said second die on said machine such that said second die is approximately lined up with said die operating position;

deactuating said second set of quick die change systems;

actuating said first set of said quick die change systems;

moving said second die into said die operating position;

deactuating said second set of quick die change systems so that no roller means associated with either of said first or said second set of quick die change systems contacts said die; and securing said second die to said machine in said operating position.

17. the method of claim 16 further comprising the step of:

positioning at least a third die on said staging table proximate said machine.

18. A system for maximizing machine utilization, said system comprising:

a machine;

means, operatively connected to said machine, for operating any one of a plurality of dies to produce parts, said operating means having a bolster with an upper surface, said bolster having at least one slot means formed therein and at least two locator means operatively connected thereto;

means, operatively connected to said machine, for prestaging at least two dies thereon and for transferring selected dies between said machining and said pre-staging means;

a first set of at least two parallel selectively inflatable and deflatable quick die changes systems operatively positioned on said bolster, for accurately positioning said die on said machine;

a second set of at least two parallel selectively inflatable and deflatable quick die change systems operatively positioned on said bolster for accurately positioning said die on said machine in the direction perpendicular to said first set, said first set and said second set of said quick die change systems being positioned on said bolster parallel to each other; and switch means, operatively connected to said first and second sets of said quick die change systems and to a pressurized fluid supply means, for selectively inflating and deflating said first and said second sets of quick die change systems so that said die is operatively positioned on said bolster relative to said operating means with a minimum of friction between the contacting surfaces of said bolster and said die, said switch means having at least three positions, when in one position, both of said first and said second sets of quick die change systems are deflated, when in another position only one of said two sets of said quick die change system is inflated and the other system is deflated, when in neither of the above positions only the one of said two sets of said quick die change systems which was inflated above is now deflated and the other set which was deflated above is now inflated.

19. The system of claim 18 wherein said first and said second sets of quick die change systems further comprise:

cavity means operatively positioned on said machine;

fluid container means, operatively positioned in said cavity means, operatively positioned in said cavity means, said fluid container means having a plurality of roller means operatively positioned thereon; and inflation means, operatively connected to each fluid container means, for selectively inflating each of said fluid container means such that said roller means raise above the upper surface of said bolster.

* * * * *

UNITED STATES PATENT AND TRADEMARK OFFICE
CERTIFICATE OF CORRECTION

PATENT NO.  : 4,819,554

DATED       : April 11, 1989

INVENTOR(S) : Dennis G. Fleischer, et al.

It is certified that error appears in the above-identified patent and that said Letters Patent is hereby corrected as shown below:

In the title of the patent, it should read --DIE TRANSFER AND QUICK CHANGE SYSTEM -- and delete "TRANSFER AND QUICK CHANGE SYSTEM".

Column 8, line 40, delete "the" (first occurrence) and insert therefor --The--.

Signed and Sealed this

Twelfth Day of March, 1991

*Attest:*

HARRY F. MANBECK, JR.

*Attesting Officer*      *Commissioner of Patents and Trademarks*